US011512584B2

(12) United States Patent
Maida, Jr. et al.

(10) Patent No.: US 11,512,584 B2
(45) Date of Patent: Nov. 29, 2022

(54) FIBER OPTIC DISTRIBUTED TEMPERATURE SENSING OF ANNULAR CEMENT CURING USING A CEMENT PLUG DEPLOYMENT SYSTEM

(71) Applicant: HALLIBURTON ENERGY SERVICES, INC., Houston, TX (US)

(72) Inventors: John Laureto Maida, Jr., Houston, TX (US); Christopher Lee Stokely, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 150 days.

(21) Appl. No.: 17/017,325

(22) Filed: Sep. 10, 2020

(65) Prior Publication Data
US 2021/0238984 A1 Aug. 5, 2021

Related U.S. Application Data

(60) Provisional application No. 62/969,005, filed on Jan. 31, 2020.

(51) Int. Cl.
*E21B 47/07* (2012.01)
*E21B 33/14* (2006.01)
(Continued)

(52) U.S. Cl.
CPC .............. *E21B 47/07* (2020.05); *E21B 33/12* (2013.01); *E21B 33/14* (2013.01); *E21B 47/005* (2020.05);
(Continued)

(58) Field of Classification Search
CPC .......... E21B 47/07; E21B 33/12; E21B 33/14; E21B 47/005
See application file for complete search history.

(56) References Cited

U.S. PATENT DOCUMENTS 2,838,116 A  6/1958 Clark, Jr. et al.
3,250,330 A  5/1966 Smith, Jr.
(Continued)

FOREIGN PATENT DOCUMENTS

GB  2328968 A   3/1999
GB  2522061 A * 7/2015 ........... E21B 47/123
(Continued)

OTHER PUBLICATIONS

Johnson, D.O., et al., Society of Petroleum Engineers (SPE) Paper # 77460, "Identification of Steam Breakthrough Intervals Using DTS Technology," Sep. 2002.
(Continued)

*Primary Examiner* — Catherine Loikith
(74) *Attorney, Agent, or Firm* — Novak Druce Carroll LLP

(57) ABSTRACT

Systems and methods consistent with the present disclosure may position a cementing tool within a casing string of a wellbore. Such a system may include a fiber optic cable coupled to the cementing tool and may include a distributed temperature sensing (DTS) system interrogator positionable at a surface of the wellbore for transmitting an optical signal through the fiber optic cable such that a plurality of temperatures along the fiber optic cable may be identified. A reel may be used when dispensing the fiber optic cable from a first end of the fiber optic cable in response to a tension in the fiber optic cable as the cementing tool travels down the casing string behind a cement composition. A processor in communication with the DTS system may be configured to monitor the plurality of temperatures along the fiber optic cable while the cement composition cures.

21 Claims, 7 Drawing Sheets

(51) Int. Cl.
*E21B 47/005* (2012.01)
*G01K 11/3206* (2021.01)
*G01K 1/02* (2021.01)
*E21B 33/12* (2006.01)
*G01K 3/14* (2006.01)

(52) U.S. Cl.
CPC ............... *G01K 1/026* (2013.01); *G01K 3/14* (2013.01); *G01K 11/3206* (2013.01)

(56) References Cited

U.S. PATENT DOCUMENTS

| | | | |
|---|---|---|---|
| RE27,459 E | 8/1972 | Guinn et al. | |
| 4,832,121 A | 5/1989 | Anderson | |
| 5,275,038 A | 1/1994 | Sizer et al. | |
| 5,375,661 A | 12/1994 | Daneshy et al. | |
| 5,892,176 A | 4/1999 | Findlay et al. | |
| 5,996,689 A | 12/1999 | Head | |
| 6,268,911 B1 | 7/2001 | Tubel et al. | |
| 6,367,548 B1 | 4/2002 | Purvis et al. | |
| 6,531,694 B2 | 3/2003 | Tubel et al. | |
| 6,532,839 B1 | 3/2003 | Kluth et al. | |
| 7,055,604 B2 | 6/2006 | Jee et al. | |
| 7,448,448 B2 | 11/2008 | Lovell et al. | |
| 7,593,115 B2 | 9/2009 | Hernandez-Solis et al. | |
| 7,617,873 B2 | 11/2009 | Lovell et al. | |
| 8,047,285 B1 | 11/2011 | Smith | |
| 8,305,228 B2 | 11/2012 | Vigneaux | |
| 8,408,064 B2 | 4/2013 | Hartog et al. | |
| 8,436,743 B2* | 5/2013 | Auzerais | E21B 33/16 340/854.7 |
| 8,476,583 B2* | 7/2013 | Legrand | G01V 8/24 250/256 |
| 9,708,867 B2 | 7/2017 | Lovell et al. | |
| 2002/0007945 A1 | 1/2002 | Neuroth et al. | |
| 2011/0079401 A1 | 4/2011 | Gambier | |
| 2013/0021874 A1 | 1/2013 | Hartog et al. | |
| 2014/0034301 A1 | 2/2014 | Leblanc | |
| 2016/0281494 A1* | 9/2016 | Shirdel | E21B 44/00 |
| 2018/0223647 A1* | 8/2018 | Johnston | E21B 47/113 |
| 2018/0245424 A1 | 8/2018 | Stokley | |
| 2019/0145250 A1* | 5/2019 | Ruhle | G01N 29/043 166/250.1 |

FOREIGN PATENT DOCUMENTS

| | | |
|---|---|---|
| WO | 2002057805 A2 | 7/2002 |
| WO | 2004018840 A1 | 3/2004 |
| WO | 2014099066 A1 | 6/2014 |

OTHER PUBLICATIONS

Fryer, V., et al., Society of Petroleum Engineers (SPE) Paper # 92962, "Monitoring of Real-Time Temperature Profiles Across Multizone Reservoirs During Production and Shut-In Periods Using Permanent Fiber-Optic Distributed Temperature Systems," Apr. 2005.

Economides, M.J., "a practical companion to reservoir stimulation," Developments in Petroleum Science, vol. 34, 1992.

Economides, M.J. et al., "Reservoir Stimulation," Second Edition, 1989.

Smith, Robert, et al., Society of Petroleum Engineers (SPE) Paper # 2686, "Computer Study of Factors Affecting Temperature Profiles in Water Injection Wells," Journal of Petroleum Engineering, p. 1447, Nov. 1970.

Rajah, Benny, et al., Society of Petroleum Engineers (SPE) Paper #29290, "Experiences and Results of Acid Prepacking and Gravelpacking Wells in the West Luton Field in Sarawak, Malaysia," Mar. 1995.

Wehunt, Jr., C.D., Society of Petroleum Engineers (SPE) Paper# 20137, "Evaluation of Alternating Phase Fracture Acidizing Treatment Using Measured Bottomhole Pressure," Mar. 1990.

Nelson, R.L., et al., Society of Petroleum Engineers (SPE) Paper# 39943, "Multiple Pad-Acid Fracs in a Deep Horizontal Well," Apr. 1998.

Krawietz, T.E., et al., Society of Petroleum Engineers (SPE) Paper # 27809, "Horizontal Well Acidizing of a Carbonate Formation: A Case History of Lisburne Treatments, Prudhoe Bay, Alaska," Nov. 1996.

International Search Report & Written Opinion; PCT Application No. PCT/US2020/050496; dated Dec. 23, 2020.

* cited by examiner

FIBER OPTIC DISTRIBUTED TEMPERATURE SENSING OF ANNULAR CEMENT CURING USING A CEMENT PLUG DEPLOYMENT SYSTEM

CROSS-REFERENCE TO RELATED APPLICATIONS

This application claims the benefit of U.S. Provisional Application No. 62/969,005, filed Jan. 31, 2020, which is incorporated herein by reference.

TECHNICAL FIELD

The present disclosure relates generally to systems and methods for completing a wellbore, and more specifically (although not necessarily exclusively), to systems and methods for distributed temperature sensing of annular cement curing.

BACKGROUND

During completion of a wellbore, the annular space between the wellbore wall and a casing string (or casing) can be filled with cement. This process is referred to as "cementing" the wellbore. A bottom plug may be inserted into the casing string after which cement may be pumped into the casing string. A top plug may be inserted into the wellbore after a desired amount of cement has been injected. The top plug, the cement, and the bottom plug may be forced downhole by injecting displacement fluid into the casing string. Variations in pressure of the displacement fluid may be used to determine the location of the top plug, the cement, and the bottom plug.

These variations in pressure may be small and may not always be detected or may be incorrectly interpreted. Knowing the position of the top plug, and thereby the cement below it, can prevent damage to the well or other errors in the cementing process. For example, variations in the pressure of the displacement fluid when the bottom plug gets trapped at an undesired location in the casing string may be incorrectly interpreted to mean the bottom plug has reached its destination at a float collar at the bottom of the casing string. Knowing the location of the top plug can increase the integrity of the well.

One technique for determining the location of the top plug is disclosed in U.S. Pat. No. 10,400,544, which is incorporated herein by reference, and will be described in greater detail below. In essence, a sacrificial fiber optic cable is attached to the top plug (or a top plug dart) before it is inserted in the casing string after pumping the desired amount of cement. The top plug is forced downhole by pumping a displacement fluid into the casing string. The top plug may be fitted with a locator device, such as a magnetic pickup coil, that generates an electrical signal each time the locator device passes a casing collar. The electrical signal may drive a light emitter to transmit a light pulse along the fiber optic cable. The light pulse may be detectable by a surface receiver and used to count the number of casing collars that the top plug passes and thereby determine the top plug's location within the wellbore.

After it is determined that the top plug has reached the float collar, the cement displaced from the casing string into the annulus will begin to cure. However, certain problems that may have occurred in the cementing process may be difficult to correct after curing.

For example, loss circulation is the total or partial loss of drilling fluids or cement to high-permeability zones, cavernous formations and natural or induced fractures (i.e., loss or "thief" zones) during the drilling or completion of a well. When loss circulation occurs, the drilling fluids or cement enter the loss zone instead of returning up the annulus around the casing.

During a cementing operation, loss zones are often detected too late. Conventionally, the only way to detect losses are when the returns don't match the flow in the well bore. As the cementing operation, by design, has transients associated with it, the mismatch between the returns and inputs is expected. Due to this, many times a loss zone is never detected or is only detected when the top of cement (as detected, for example, by a bond log) is not where it is expected to be.

To properly complete a well, cementers need to locate the top of cement within the annulus, as well as determine whether problems occurred in the cementing process. Otherwise, expensive remedial action could be required later.

DETAILED DESCRIPTION

Figure 1:
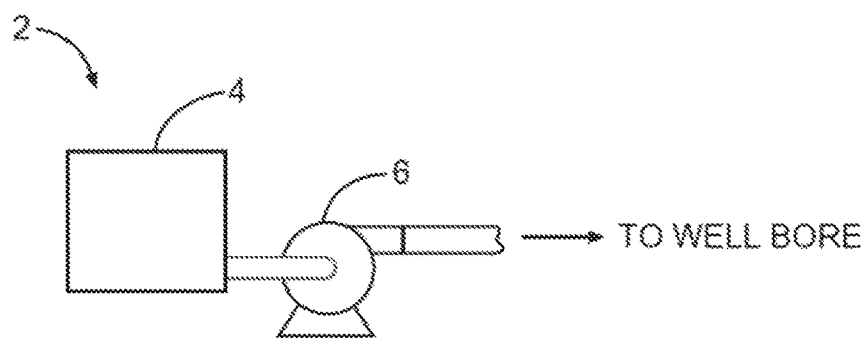
FIG. 1 illustrates a system for preparation and delivery of a cement composition to a well bore in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be apparent from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As used herein, "cement" is any kind of material capable of being pumped to flow to a desired location, and capable of setting into a solid mass at the desired location. "Cement slurry" designates the cement in its flowable state. In many cases, common calcium-silicate hydraulic cement is suitable, such as Portland cement. Calcium-silicate hydraulic cement includes a source of calcium oxide such as burnt limestone, a source of silicon dioxide such as burnt clay, and various amounts of additives such as sand, pozzolan, diatomaceous earth, iron pyrite, alumina, and calcium sulfate. In some cases, the cement may include polymer, resin, or latex, either as an additive or as the major constituent of the cement. The polymer may include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations thereof. The cement may also include reinforcing fillers such as fiberglass, ceramic fiber, or polymer fiber. The cement may also include additives for improving or changing the properties of the cement, such as set accelerators, set retarders, defoamers, fluid loss agents, weighting materials, dispersants, density-reducing agents, formation conditioning agents, loss circulation materials, thixotropic agents, suspension aids, or combinations thereof.

The cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like.

The disclosed cement compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber-optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

In one aspect, a system includes a cementing tool positionable within a casing string of a wellbore and a distributed temperature sensing (DTS) system. The cementing tool in various aspects may be a cementing top plug or a cementing top plug dart. The DTS system may include a fiber optic cable coupled to the cementing tool; and a DTS interrogator positionable at a surface of the wellbore for transmitting an optical signal through the fiber optic cable and determining from a reflected optical signal a plurality of temperatures along the fiber optic cable. The system may further include a fiber reel for dispensing the fiber optic cable from a first end of the fiber optic cable in response to a tension in the fiber optic cable as the cementing tool travels down the casing string behind a cement composition. This system may also include a processor in communication with the DTS system, which is configured to monitor the plurality of temperatures along the fiber optic cable while the cement composition cures.

In one aspect, the processor is configured to identify, based on the plurality of temperatures, one or more of a top of cement within the wellbore, a loss zone within the wellbore or a first region of the wellbore that has more or less cement than a second region of the wellbore.

The processor may be configured to generate a notification in response to monitoring one or more unexpected temperatures based on one or more of a geothermal profile and a design schematic for the wellbore. Alternatively, or in addition, the processor may be configured to generate a visualization based on the plurality of temperatures for display on a display device. The visualization may include at least a portion of a temperature contrast map. In some aspects, the at least a portion of the temperature contrast map is comparatively displayed with at least a portion of a design schematic for the wellbore. The at least a portion of the temperature contrast map may be graphically superimposed upon the at least a portion of the design schematic or vice versa.

In one aspect, an artificial neural network (ANN) trained with temperature readings from wellbores including at least one known characteristic determines a correlation between at least one temperature at the at least one known characteristic.

In another aspect, the system includes an additional fiber reel for dispensing the fiber optic cable from a second end of the fiber optic cable. The fiber optic cable may be armored or unarmored fiber optic cable. The fiber reel, in some aspects, includes a drag device for preventing the dispensing the fiber optic cable in response to the tension in the fiber optic cable being less than a pre-set value.

In one aspect, a method includes coupling a fiber optic cable to a cement tool positionable within a casing string of a wellbore, wherein the fiber optic cable is a part of a distributed temperature sensing (DTS) system further including a DTS interrogator positionable at a surface of the wellbore for transmitting an optical signal through the fiber optic cable and determining from a reflected optical signal a plurality of temperatures along the fiber optic cable. The method may also include coupling one end of the fiber optic cable to a fiber reel for dispensing the fiber optic cable as the cementing tool travels down the casing behind a cement composition. The method may further include dispensing, by the fiber reel, the fiber optic cable from an end of the fiber optic cable in response to a tension in the fiber optic cable. Finally, the method may include monitoring the plurality of temperatures via the DTS system while the cement composition cures.

In various aspects, the fiber optic cable can be dispensed (or unspooled) at one end by a reel (or bobbin) positioned proximate to the cementing tool. An additional reel can be positioned proximate to the surface of the wellbore and can also unspool additional lengths of the fiber optic cable. The fiber optic cable can be a sacrificial cable that remains within the wellbore until it, ultimately, is destroyed during wellbore operations, for example during stimulation.

Additional methods for monitoring the location of the cementing tool can also be utilized in conjunction with the systems and methods described herein. An additional method may include monitoring wellbore fluid pressure from the surface to determine when a cementing tool reaches a key location during cementing. For example, the fluid pressure can increase when the bottom plug arrives at a float collar positioned at the bottom of the casing string. However, changes in the wellbore fluid pressure can be very small, just a few hundred pounds per square inch, and may be missed at the surface.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Referring now to FIG. 1, a system that may be used in cementing operations will now be described. FIG. 1 illustrates a system 2 for preparation of a cement composition and delivery to a well bore in accordance with certain embodiments. As shown, the cement composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 2A:
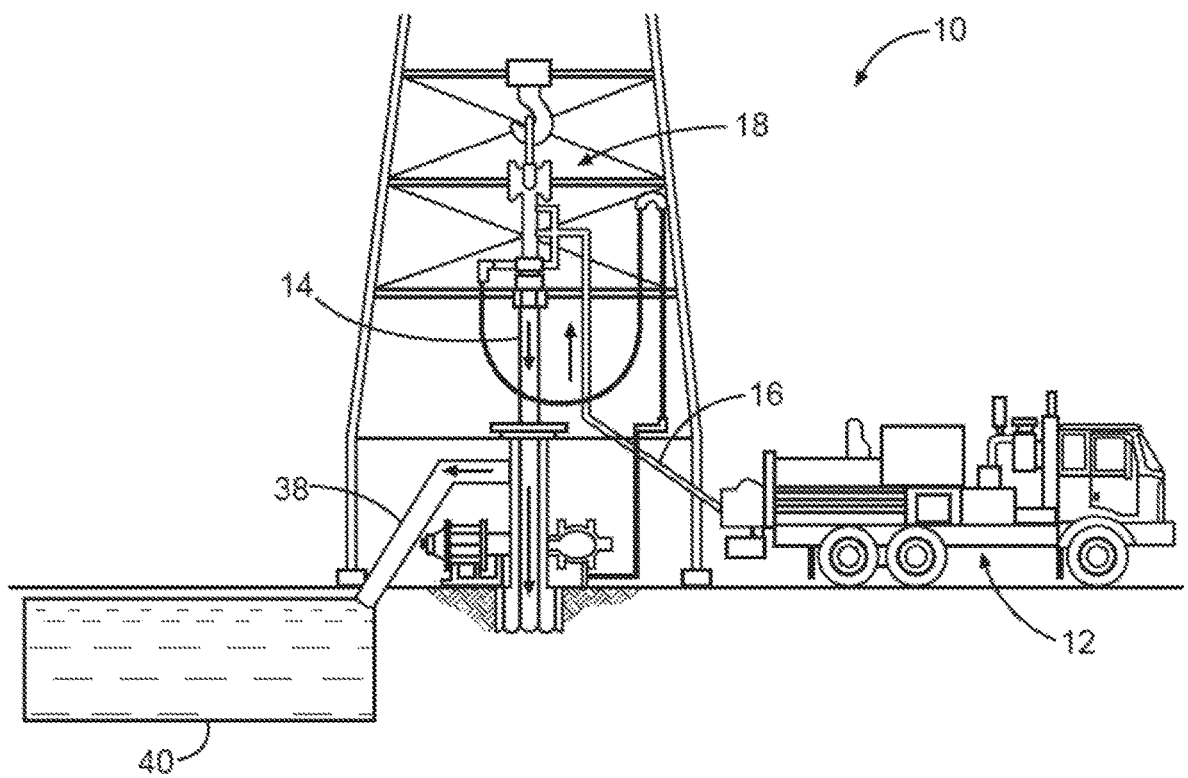
FIG. 2A illustrates surface equipment that may be used in placement of a cement composition in a well bore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
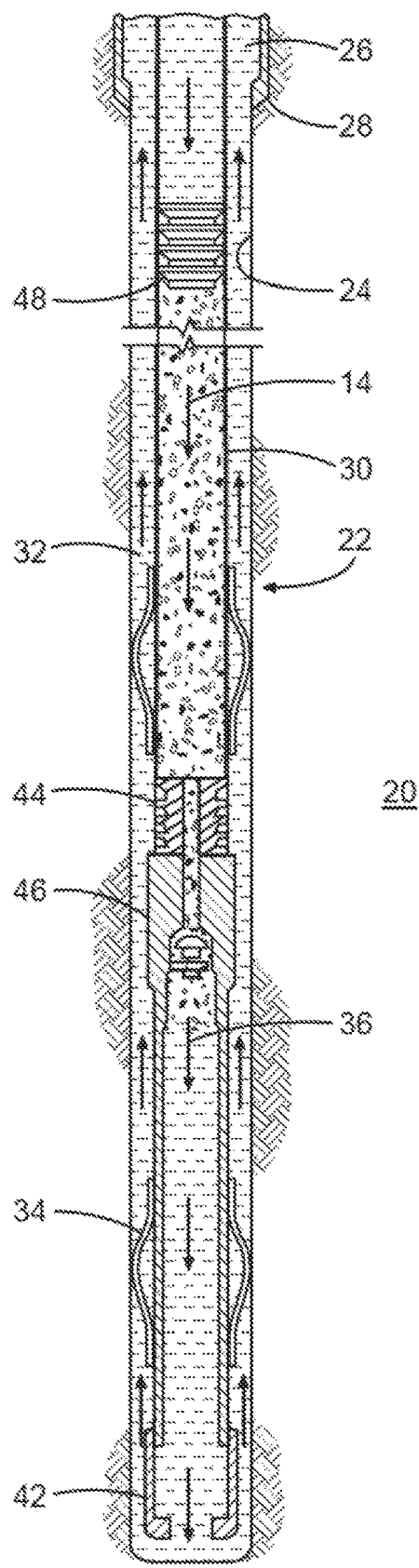
FIG. 2B illustrates placement of a cement composition into a well bore annulus in accordance with aspects of the present disclosure.

Turning now to FIG. 2B, the cement composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A.

Referring again to FIG. 2B, a bottom plug 44 may be introduced into the casing 30 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the well bore 22 behind the cement composition 14. The top plug 48 may separate the cement composition 14 from a displacement fluid 53 and also push the cement composition 14 through the bottom plug 44.

Figure 3:
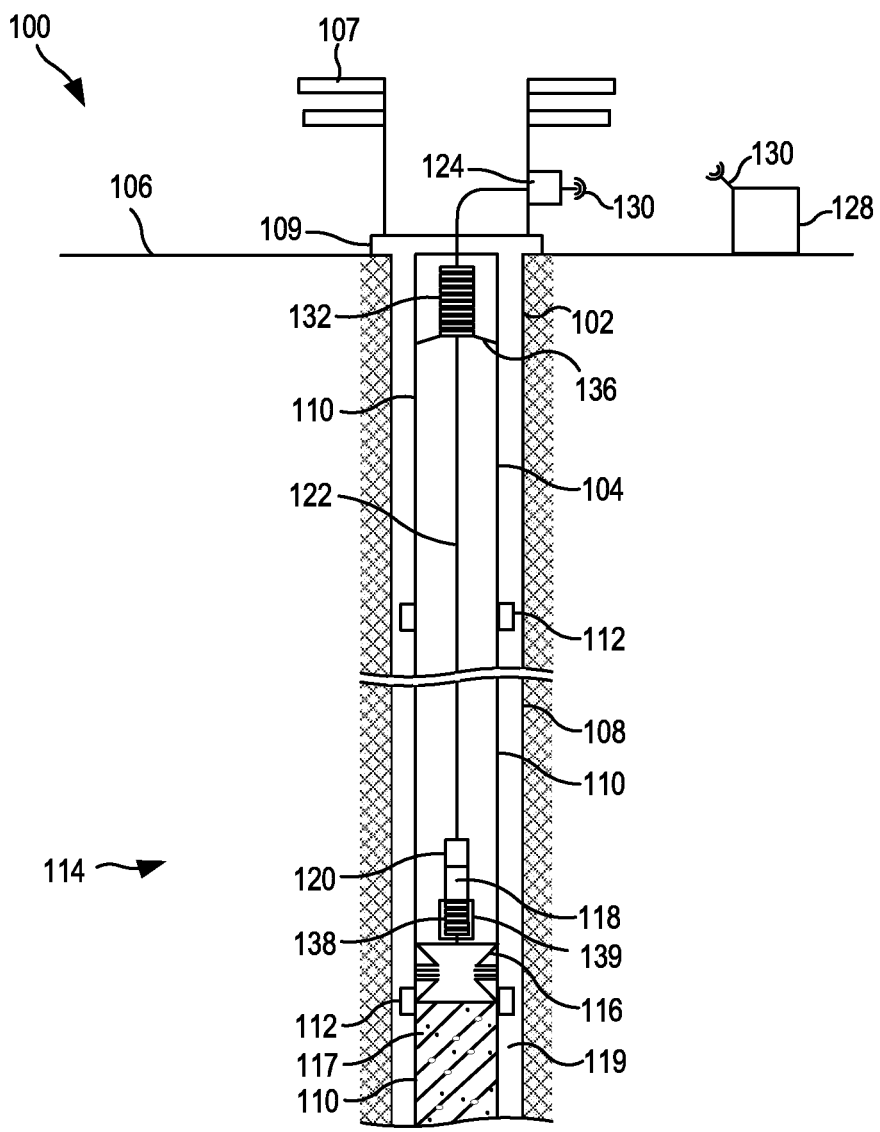
FIG. 3 is a schematic diagram of a well system for cementing a wellbore and tracking a cementing tool in accordance with aspects of the present disclosure.

FIG. 3 is a schematic diagram of a well system 100 for tracking the location of a cementing tool using fiber optic telemetry. The well system 100 can include a wellbore 102 with a casing string 104 extending from the surface 106 through the wellbore 102. A blowout preventer 107 ("BOP") can be positioned above a wellhead 109 at the surface 106. The wellbore 102 extends through various earth strata and may have a substantially vertical section 108. In some aspects, the wellbore 102 can also include a substantially horizontal section. The casing string 104 includes multiple casing tubes 110 coupled together end-to-end by casing collars 112. In some aspects, the casing tubes 110 are approximately thirty feet in length. The substantially vertical section 108 may extend through a hydrocarbon bearing subterranean formation 114.

A cementing tool, for example a cement plug 116 can be positioned downhole in the casing string 104. The cement plug 116 can be a top plug that is inserted into the casing string 104 after a desired amount of cement 117 has been injected into the casing string 104. In some aspects, a dart for plugging a cement plug can be used in place of the cement plug 116. The cement plug 116 can be forced downhole by the injection of displacement fluid from the surface 106. A bottom plug can be positioned below cement 117 and can be forced downhole until it rests on a floating collar at the bottom of the casing string 104. The cement plug 116 can be forced downhole until it contacts the bottom plug. The cement plug 116 can force the cement 117 downhole until it ruptures the bottom plug and is forced out of a shoe of the casing string 104. The cement 117 can flow out of the casing string 104 and into the annulus 119 of the wellbore 102. Knowing the position of the cement plug 116 within the wellbore 102 can prevent errors in the cementing process and can increase the integrity of the well.

The cement plug 116 can be coupled to a locator device that can generate a voltage in response to a change in a surrounding magnetic field. In some aspects, the locator device can be a magnetic pickup coil 118. In some aspects, a piezoelectric sensor or other suitable locator device can be used. The magnetic pickup coil 118 can include a permanent magnet with a coil wrapped around it. The casing tubes 110 can each emit a magnetic field. Each casing collar 112 can emit a magnetic field that is different from the magnetic field emitted by the casing tubes 110 joined by the casing collar 112. The change in the magnetic field between the casing collars 112 and the casing tubes 110 can be detected by the magnetic pickup coil 118. The magnetic pickup coil 118 can generate a voltage in response to the change in the surrounding magnetic field when the magnetic pickup coil 118 passes a casing collar 112. The voltage generated by the magnetic pickup coil 118 can be in proportion to the velocity of the magnetic pickup coil 118 as it travels past the casing collar 112. In some aspects, the magnetic pickup coil 118 can travel between approximately 10 feet per second and approximately 30 feet per second.

The magnetic pickup coil 118 can be coupled to a light source, for example an LED 120. The voltage generated by the magnetic pickup coil 118 can momentarily energize the LED 120 coupled to the magnetic pickup coil 118. The LED 120 can emit a pulse of light (e.g., an optical signal) in response to the voltage generated by the pickup coil 118. The LED 120 can transmit the pulse of light to a receiver 124 positioned the surface 106. In some aspects, the LED 120 can operate at a 1300 nm wavelength and can minimize Rayleigh transmission losses and hydrogen-induced and coil bend-induced optical power losses. In some aspects, a high speed laser diode or other optical sources can be used in place of the LED 120 and various other optical wavelengths can be used. For example, wavelengths from about 850 nm to 2100 nm can make use of the optical low-transmission wavelength bands in ordinary fused silica multimode and single mode fibers.

The drive circuit of the LED 120 can require a minimum voltage be generated by the magnetic pickup coil 118 to complete the circuit and generate the pulse of light. In some aspects, the drive circuit of the LED 120 can be biased with energy from a battery or other energy source. The biased drive circuit of the LED 120 can require less voltage be induced in the magnetic pickup coil 118 to complete the circuit and generate the pulse of light. The biased drive circuit of the LED 120 can allow small changes in the magnetic field sensed by the magnetic pickup coil 118 to generate a sufficient voltage to energize the LED 120. In some aspects, the biased drive circuit of the LED 120 can allow the magnetic pickup coil 118 traveling at a low velocity past a casing collar 112 to generate enough voltage to complete the circuit of the LED 120 and emit a pulse of light. In some aspects, a light source can be positioned proximate to the surface 106 and can transmit an optical signal downhole to determine the location of a collar locator within the casing string 104.

The pulse of light generated by the LED 120 can be transmitted to the receiver positioned at the surface 106 using a fiber optic cable 122. The receiver 124 can be an optical receiver, for example a photodetector that can convert the optical signal into electricity. In some aspects, the receiver 124 can count the number of pulses of light received via the fiber optic cable 122. The number of light pulses received by the 124 can indicate the number of casing collars 112 the magnetic pickup coil 118 and plug 116 have passed. The wellbore 102 can be mapped at the surface based on the number of casing tubes 110 positioned within the wellbore 102 and their respective lengths. The number of casing collars 112 the cement plug 116 has passed can indicate the position of the cement plug 116 within the wellbore. In some aspects, the receiver 124 can transmit information to the magnetic pickup coil 118 or other collar locator via the fiber optic cable 122.

The receiver 124 can be communicatively coupled to a computing device 128 located away from the wellbore 102 by a communication link 130. The communication link 130 may be a wireless communication link. The communication link 130 can include wireless interfaces such as IEEE 802.11, Bluetooth, or radio interfaces for accessing cellular telephone networks (e.g., transceiver/antenna for accessing a CDMA, GSM, UMTS, or other mobile communications network). In some aspects the communication link 130 may be wired. A wired communication link can include interfaces such as Ethernet, USB, IEEE 1394, or a fiber optic interface. The receiver 124 can transmit information related to the optical signal, for example but not limited to the light pulse count, the time the light pulse arrived, or other information, to the computing device 128. In some aspects, the receiver 124 can be coupled to a transmitter that communicates with the computing device 128.

The fiber optic cable 122 that transmits the light pulse to/from the LED 120 to receiver 124 can be an unarmored fiber. The unarmored fiber can include a fiber core and cladding but no outer buffer. In some aspects, the fiber optic cable 122 can be an armored fiber. The armored fiber can include a fiber core, a cladding, and an outer buffer. The inclusion of the outer buffer can increase the diameter of the fiber optic cable. The fiber optic cable 122 can be a multi-mode or single-mode optical fiber. The fiber optic cable can include one or more optical fibers. The fiber optic cable 122 can be a sacrificial cable that is not retrieved from the wellbore 102 but instead remains in the wellbore 102 until it is destroyed. For example, the fiber optic cable 122 can be destroyed during stimulation of the wellbore 102.

The fiber optic cable 122 can be dispensed from an upper bobbin or reel 132 positioned within the wellbore 102 proximate to the surface 106 as the cement plug 116 is forced downhole. In some aspects, the upper reel 132 can be positioned at the surface 106, for example proximate to the blowout preventer 107. The upper reel 132 can be secured within the wellbore 102 by a securing device, for example by spring loaded camming feet 136 or other suitable securing mechanisms. The upper reel 132 can have a zero tension payout that can dispense the fiber optic cable 122 when there is a tension in the fiber optic cable 122.

The fiber optic cable 122 can be tensioned by and pulled along with the displacement fluid being injected into the casing string 104 to move the cement plug 116. The upper reel 132 can dispense additional lengths of the fiber optic cable 122 as the fiber optic cable 122 is tensioned by the displacement fluid injected into the wellbore 102. In some aspects, the fiber optic cable 122 can spool off the upper reel 132 at the same rate as the flow of the displacement fluid. The upper reel 132 can prevent the fiber optic cable from breaking or otherwise becoming damaged as the fiber optic cable 122 and the plug 116 travel downhole.

The fiber optic cable 122 can also be spooled on and dispensed from a lower bobbin or reel 138 positioned proximate to the magnetic pickup coil 118. The lower reel 138 can include a drag device 139. The drag device 139 can allow the lower reel 138 to dispense the fiber optic cable 122 only when a pre-set tension in the fiber optic cable 122 is reached. The lower reel 138 can prevent the fiber optic cable from breaking or otherwise becoming damaged as the fiber optic cable 122 and the cement plug 116 travel downhole. The upper reel 132 and the lower reel 138 can store greater lengths of unarmored fiber optic cable than armored fiber optic cable. While FIG. 3 depicts the lower reel 138 positioned below the LED 120 and the magnetic pickup coil 118, in some aspects the lower reel 138 could be positioned elsewhere with respect to the LED 120 and the magnetic pickup coil 118.

Figure 4:
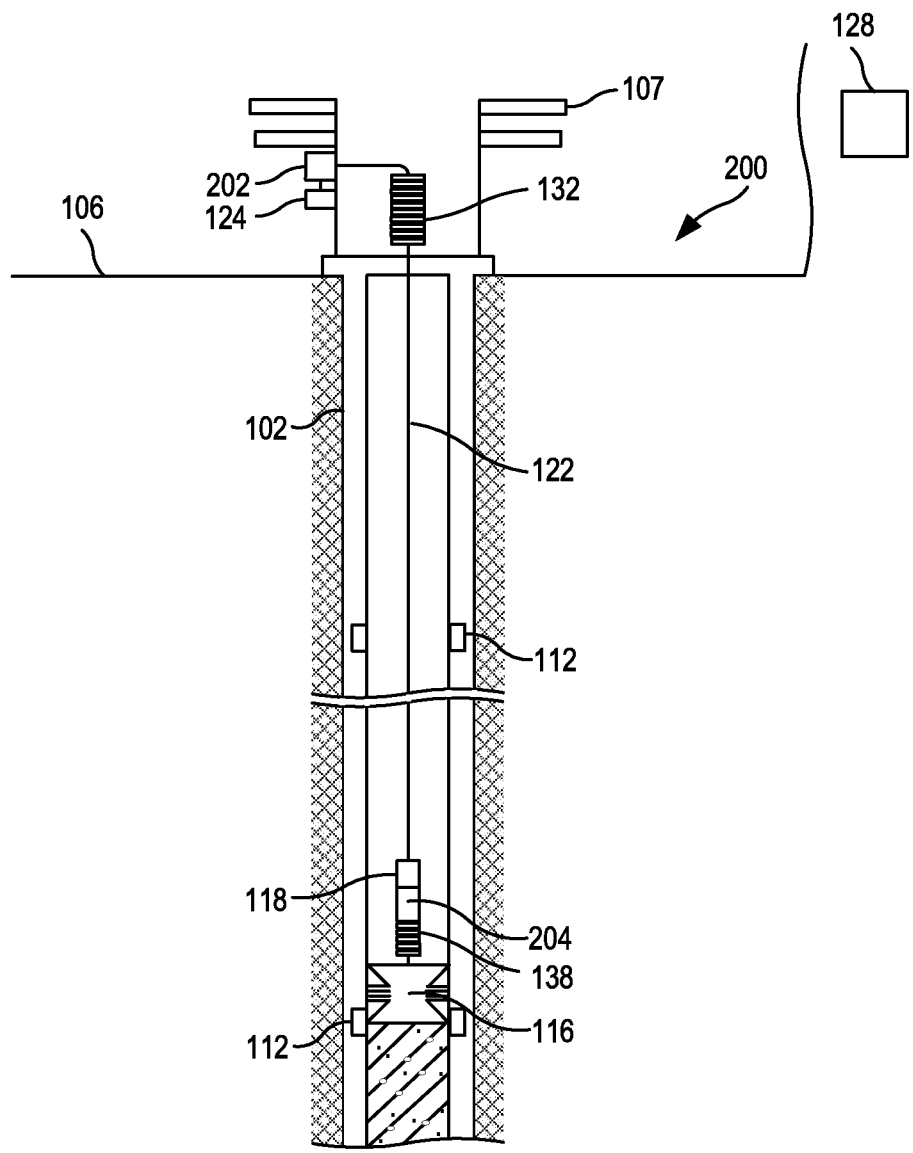
FIG. 4 is a schematic diagram of a well system for cementing a wellbore and tracking a cementing tool in accordance with aspects of the present disclosure.

FIG. 4 is a schematic diagram of another example of a well system 200 for tracking the location of a cementing tool, the system 200 including a light source that is a laser 202. The laser 202 can be positioned at the surface 106 proximate to the BOP 107. The laser 202 is coupled to the fiber optic cable 122 which can be dispensed at an end by the upper reel 132. The upper reel 132 can be positioned at the surface 106 proximate to the BOP 107. In some aspects the laser 202 and the upper reel 132 can be positioned elsewhere at the surface 106 or within the wellbore 102.

The laser 202 can be a high repetition pulse laser or other suitable light source. The laser 202 can generate an optical signal, for example, a series of light pulses that are transmitted by the fiber optic cable 122. The cement plug 116 can be coupled to the reel 138, the magnetic pickup coil 118. A modulation device can be coupled to the magnetic pickup coil 118 proximate to an end of the fiber optic cable 122. The device can be, for example but not limited to, a pendulum switch 204. The pendulum switch 204 can include a mirror that can be shifted between two positions.

The optical signal generated by the laser 202 can travel the length of the fiber optic cable 122 and reach a lower end of the fiber optic cable 122 proximate to the lower reel 138. The pendulum switch 204 can be positioned proximate to the lower end of the fiber optic cable. The pendulum switch 204 can modulate the optical signal (e.g., pulses of light) generated by the laser 202 in response to a voltage generated by the magnetic pickup coil 118 as it passes a casing collar 112. In some aspects, a piezoelectric sensor, or another suitable modulation device can be used to modulate the optical signal of the laser 202. In some aspects, the modulation device can modulate, for example but not limited to, the frequency, amplitude, phase, or other suitable characteristic of the optical.

The pendulum switch 204 can include a mirror. The position of the mirror of the pendulum switch 204 can be controlled by the magnetic pickup coil 118. The mirror of the pendulum switch 204 can have two positions. In a first position, the mirror of the pendulum switch 204 can reflect the pulse of light arriving at the lower end of the fiber optic cable 122 away from the fiber optic cable 122. The pulse of light can fail to be re-transmitted to the receiver 124 via the fiber optic cable 122. In a second position, the mirror of the pendulum switch 204 to reflect the pulse of light back arriving at the lower end of the fiber optic cable 122 back into the fiber optic cable 122. The pulse of light can be re-transmitted to the receiver 124 via the fiber optic cable 122. The position of the mirror of the pendulum switch 204 can be controlled by the magnetic pickup coil 118.

In one aspect, the laser 202 can transmit an optical signal down the fiber optic cable 122 (e.g., a series of light pulses). The magnetic pickup coil 118 can generate a voltage when it passes a casing collar 112. The voltage generated by the magnetic pickup coil 118 can switch the position of the mirror of the pendulum switch 204 from the first position to the second position. In other words, in some aspects voltage generated by the magnetic pickup coil 118 can move the mirror of the pendulum switch 204 to reflect the light pulse away from the fiber optic cable 122.

The receiver 124 at the surface 106 can monitor the light pulses transmitted along the fiber optic cable 122. The receiver 124 can detect when a pulse of light transmitted by the laser 202 is not returned to the receiver 124 via the fiber optic cable 122. The pulse of light that is transmitted downhole by the laser 202 but not transmitted back to the surface 106 can indicate the pendulum switch 204 reflected the light pulse away from the fiber optic cable 122. The pendulum switch 204 can be controlled by the magnetic pickup coil 118 in response to whether a voltage is generated by the magnetic pickup coil 118. The "missed" pulse of light can thereby indicate that the magnetic pickup coil 118 (and therefore the cement plug 116) passed a casing collar 112. In some aspects, the receiver 124 can transmit information regarding the light pulses to the computing device 128 located at a separate location. The location of the cement plug 116 can be determined using the information relating to the light pulses transmitted by the receiver 124. In some aspects, the receiver 124 can include an interferometer. In some aspects, the interferometer can determine the phase of the optical signal.

In some aspects, when there is no voltage generated by the magnetic pickup coil 118 the pendulum switch 204 can be positioned to reflect the optical signal (i.e., the pulse of light) away from the end of the fiber optic cable 122. In this aspect, the pendulum 204 can be moved to reflect the optical signal back into the fiber optic cable 122 in to the magnetic pickup coil 118 generating a voltage when it passes the casing collar 112. The receiver 124 at the surface can detect the arrival of the optical signal, which can indicate the magnetic pickup coil 118 (and the cement plug 116) passed a casing collar.

The fiber optic cable 122 can be dispensed from the upper reel 132 in response to the tension in the fiber optic cable 122 increasing above a pre-set limit. The upper reel 132 can have a zero tension payout that releases additional lengths of fiber optic cable 122 when the tension in the fiber optic cable 122 increases beyond zero. The lower reel 138 can also dispense additional lengths of the fiber optic cable 122. The lower reel 138 can include a drag device that can prevent the release of additional lengths of the fiber optic cable 122 until a pre-set tension is reached. In some aspects, only a single reel may be used to dispense the fiber optic cable 122. In aspects in which an upper reel 132 and a lower reel 138 are both used, the shared fiber payout can minimize potential fiber over tension or fiber damage from chaffing against the wellbore or a tubing string. For example, the wellbore 102 can include a bent or highly deviated heel or can curve and become horizontal. The upper reel 132 and the lower reel 138 can prevent the fiber optic cable 122 from breaking, chaffing, or otherwise becoming damaged as the cement plug 116 and fiber optic cable 122 are forced around a curve into a horizontal or lateral.

In some aspects, the fiber optic cable 122 can be actively dispensed from the upper reel 132 or a lower reel 138 by a motor. In some aspects, one or both of the upper reel 132 and the lower reel 138 can utilize soft high-temperature rated polymer cements or binders to hold the fiber optic cable 122 as it turns around the reel. As the fiber optic cable 122 spooled on the applicable reel is dispensed by the increased tension in the cable, the fiber optic cable 122 can be peeled from the outermost layer.

In some aspects, the location of the cement plug 116 can be controlled in response to the optical signal detected by the receiver 124. For example, the injection of displacement fluid from the surface 106 can be stopped in response to the optical signal detected by the receiver 124 indicating the magnetic pickup coil 118 (and the cement plug 116) have reached a desired location within the wellbore 102. The cement plug 116 can stop moving downhole when the displacement fluid is no longer injected into the 102. In some aspects, the injection rate of the displacement fluid can be lowered to slow the velocity of the cement plug 116 as it approaches a desired location to better control placement of the cement plug 116.

Additional techniques for determining the position of the cement plug 116 within the wellbore 102 can be used in conjunction with the present disclosure. For example, the pressure of the displacement fluid can be measured and used to aid in determining when a bottom plug arrives at the float collar and other steps in the cementing process. However, the pressure variations monitored can be very small, for example a few hundred pounds per square inch, and may be missed on the surface.

Figure 5:
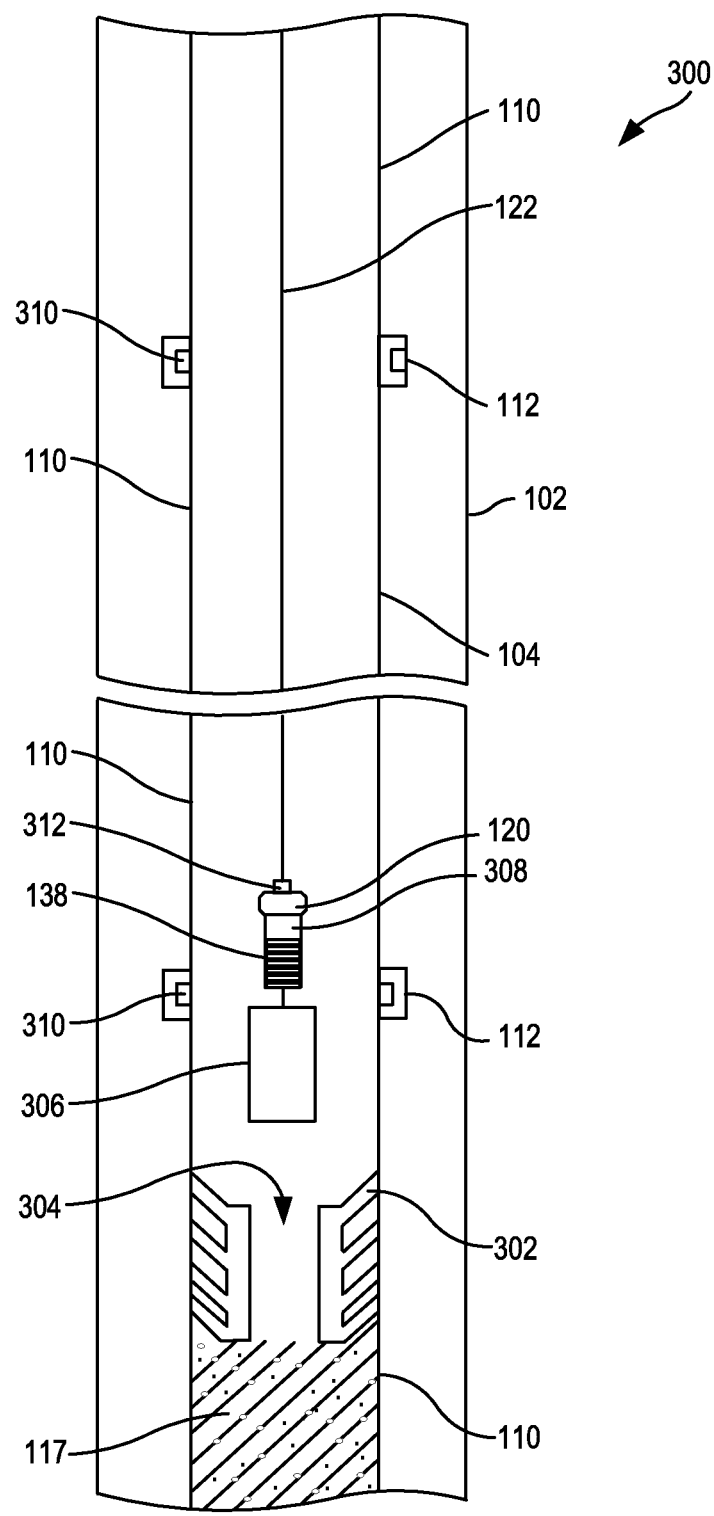
FIG. 5 is a schematic diagram of a well system for cementing a wellbore and tracking a cementing tool in accordance with aspects of the present disclosure.

FIG. 5 is a schematic diagram of another example of a well system 300 for tracking the location of a cementing tool that includes a locator device that is a radio frequency identification ("RFID") reader. A cement plug 302 having an opening 304 can be lowered into the wellbore 102 within the casing tube 110 of the casing string 104. The cement 117 can be pumped into the wellbore 102 and can pass through the opening 304 of the cement plug 302. After the desired amount of cement 117 has been pumped into the wellbore 102 a cementing tool, for example a dart 306, can be launched from the surface to dock with and seal the opening 304. The dart 306 can be forced downhole by the injection of the displacement fluid from the surface.

The RFID reader 308 can be coupled proximate to the dart 306. The RFID 308 can detect a change in a magnetic field (e.g., a signal) associated with one or more RFID tags 310 in response to an RFID tag 310 being in a detectable range of the RFID reader 308. The RFID tags 310 can be positioned proximate to the casing collars 112 being positioned within the wellbore 102. In some aspects, the RFID tags 310 can be positioned elsewhere in the wellbore 102, for example at a float collar at the bottom of the casing string 104. The RFID reader 308 can generate an electrical signal in response to detecting one or more of the RFID tags 310. The RFID reader 308 can be coupled to the LED 120 or another suitable light source and the lower reel 138.

The dart 306 can be forced downhole by the injection of displacement fluid from the surface 106. The RFID reader 308, the LED 120, and the lower reel 138 can move downhole with the dart 306. The RFID reader 308 can generate and transmit an electrical signal to the LED 120 in response to detecting an RFID tag 310. The LED 120 can generate a pulse of light in response to the RFID reader 308 detecting the RFID tag 310. The pulse of light can be transmitted to the receiver at the surface by the fiber optic cable 122. The location of the dart 306 can be determined based on the number of light pulses detected by the receiver. The location of the dart 306 can be monitored as the dart 306 travels downhole to dock with the cement plug 302 and seal the opening 304. Once the dart 306 has docked with the cement plug 302, both devices can be forced downhole by displacement fluid injected from the surface until the cement plug 302 and dart 306 contact the bottom plug. As the cement plug 302 and the dart 306 continue to travel downhole the location of the cement plug 302 and the dart 306 can be monitored.

An additional sensor 312 can be coupled to the fiber optic cable 122 for monitoring a condition within the wellbore 102. In some aspects, the additional sensor can be a temperature sensor, an acoustic sensor, a sheer sensor, a pressure sensor, an accelerometer, a chemical sensor, or other suitable sensor. The additional sensor 312 can monitor a condition within the wellbore 102 and transmit information regarding the condition to the receiver via the fiber optic cable 122. In some aspects, the receiver can include a transmitter for transmitting commands to the additional sensor 312 via the fiber optic cable 122. In some aspects, more than one additional sensor 312 may be utilized.

Figure 6:
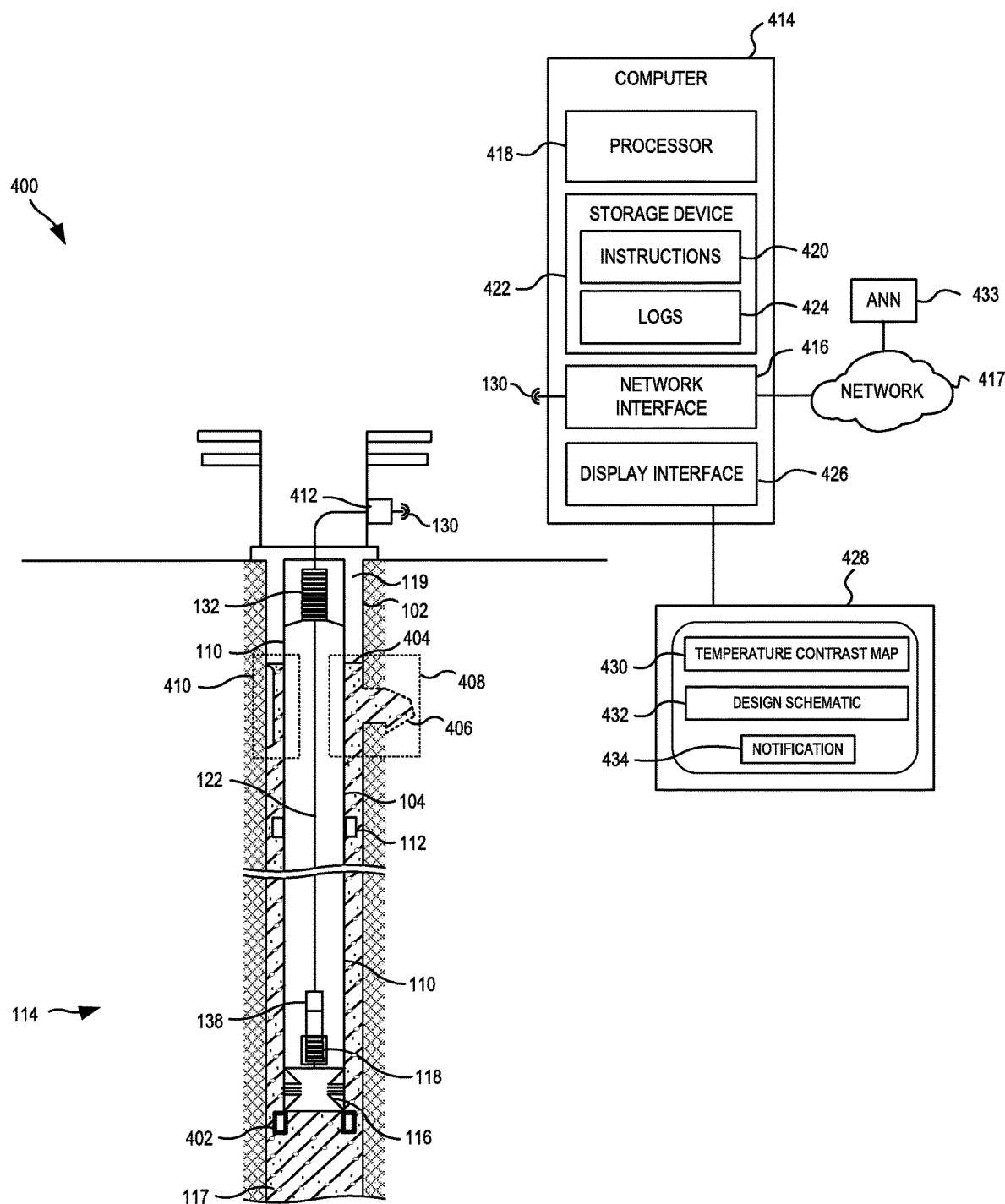
FIG. 6 is a schematic diagram of a system for fiber optic distributed temperature sensing of annular cement curing using cement plug deployment according to an example of the present disclosure.

FIG. 6 is a schematic diagram of a system 400 for distributed temperature sensing of annular cement curing using a fiber optic cable 122. The fiber optic cable 122 may be deployed within the casing string 104 by a cement plug 116 or dart 306 as described above with reference to FIGS. 3-5.

As a displacement fluid is pumped into the casing string 104, the cement plug 116 drives the cement 117 to the bottom of the wellbore 102, where it flows around a float collar 402 and up into the annulus 119. The float collar 402 impedes further downward movement of the cement plug 116, which may be detectable as a change of pressure in the displacement fluid. Alternatively, the arrival of the cement plug 116 at the float collar 402 may be detected using the techniques disclosed herein, e.g., counting the number of casing collars 112 passed by the magnetic coil 118.

As previously noted, locating the top of cement 404 in the annulus 119 is useful because various problems in the cementing process may be indicated if the top of cement 404 is not where it is expected to be. For example, the wellbore 102 may have encountered a loss zone 406 resulting, in some cases, in a region 408 of excess (i.e., greater than expected) cement 117. Likewise, there may be one or more regions 410 of insufficient (i.e., less than expected) cement 117 where the annulus 119 is not completely filled. Cementers would like to detect and fix these and other problems as soon as possible before the cement 117 is fully cured.

Cement curing is an exothermic reaction that releases considerable heat over a period of approximately 48 hours. The heat is detectable over the geothermal background, which generally follows a uniform gradient based on depth. Knowing how much heat is released at various points along the wellbore 102 may be used to approximate the amount of cement 117 that has accumulated at those points. This, in turn, may be used to identify regions 408, 410 of excess or insufficient cement 117, loss zones 406 and/or other anomalies, and generally whether the cementing process has proceeded according to the design schematic for the wellbore 102.

Conventionally, deploying temperature sensors throughout a wellbore 102 is expensive. However, in one aspect, the fiber optic cable 122 disclosed in FIGS. 3-5 may be used as a linear temperature sensor as part of a Distributed Temperature Sensing (DTS) system. However, in one aspect, the fiber optic cable 122 disclosed in FIGS. 3-5 may be used as a linear temperature sensor as part of a Distributed Temperature Sensing (DSS) system. Accordingly, separate sensors or a separate trip downhole is not required in order to determine the temperature at various points in the wellbore 102.

In addition to the fiber optic cable 122, the DTS system may include a DTS interrogator 412 that transmits approximately 1 m laser pulses (equivalent to a 10 ns time) into the fiber optic cable 122. As the pulse travels along the length of the fiber optic cable 122, it interacts with the glass. Due to small imperfections in the glass, a tiny amount of the original laser pulse is reflected back to towards the DTS interrogator 412. By analyzing the reflected light using techniques such as Raman scattering, the DTS interrogator 412 is able to calculate the temperature of the event (by analyzing the power of the reflected light) and also the location of the event (by measuring the time it takes the backscattered light to return). Temperatures are recorded along the fiber optic cable 122 as a continuous profile. A high accuracy of temperature determination may be achieved over great distances. Typically, DTS systems can locate the temperature to a spatial resolution of 1 m with accuracy to within ±1° C. at a resolution of 0.01° C. DTS interrogators 412, such as the FIBERWATCH DTS SERVICE INTERROGATOR®, are available from HALLIBURTON®.

In one aspect, the DTS interrogator 412 may transmit temperature data for various points along the fiber optic cable 122 using the communication link 130 described earlier. As noted above, the communication link 130 may be wireless and include wireless interfaces, such as IEEE 802.11, Bluetooth, or radio interfaces for accessing cellular telephone networks (e.g., transceiver/antenna for accessing a CDMA, GSM, UMTS, or other mobile communications network), or the like. In some aspects, the communication link 130 may be wired and include such interfaces as Ethernet, USB, IEEE 1394, or a fiber optic interface.

Temperature data from the communication link 130 may be received by a computer 414 via a network interface 416 with a compatible communication link 130. In some aspects, the computer 414 may use the same or a different network interface 416 to communicate with one or more networks 417, such as local area network (LAN) and/or wide area network (WAN), such as the Internet.

The computer 414 may also include a processor 418 for processing the received temperature data and controlling the other components of the computer 414. The processor 418 may be embodied, without limitation, as a microprocessor, application-specific integrated circuit (ASIC), digital signal processor (DSP), field-programmable gate array (FPGA) or the like. The processor 418 may execute instructions 420 stored in a storage device 422 to perform aspects of the methods described herein. The storage device 422 may also be used to store one or more logs 424, which may be embodied as any suitable data structure(s) for representing received and/or processed data.

In one aspect, the computer 414 may further include a display interface 426, such as a graphics card, for displaying graphics and/or text on a display device 428, such as a computer monitor. As described in greater detail below, the display interface 426, under control of the processor 418, may be configured to display temperature data in the form of a temperature contrast map 430.

In some aspects, the temperature contrast map 430 may be comparatively displayed with a design schematic 432 for the well bore 102, allowing a cementer to be able to visually observe anomalous "hot" or "cold" spots that may correspond to problems with the cementing process. The temperature contrast map 430 may be configured to indicate the top of cement 404 and/or identify regions 408, 410 of suspected excess/insufficient cement 117 and/or loss zones 406, as well as other anomalies detectable through the temperature data.

Correlation between temperatures and cementing issues/anomalies may be determined experimentally and/or by machine learning using, for example, an artificial neural network (ANN) 433 trained with temperature readings from wellbores 102 with known characteristics, such as the top of cement 404, loss zones 406, regions 408, 410 of excess/insufficient cement, etc. The ANN 433 may be a software stored within the computer 414 or accessed, as illustrated, via the network 417. The ANN 433 may be configured to output evaluations of the temperature data, including, without limitation, identification of the top of cement, regions 408, 410 of excess or insufficient cement 117, loss zones 406, kicks (the inverse of loss zones 406 resulting in fluid influx), or the like.

Alternatively, or in addition, the display interface 426, under control of the processor 418, may be configured to display one or more notifications 434 (or alerts) to indicate the existence and/or location of temperature readings that could signal problems in the cementing process.

Figure 7:
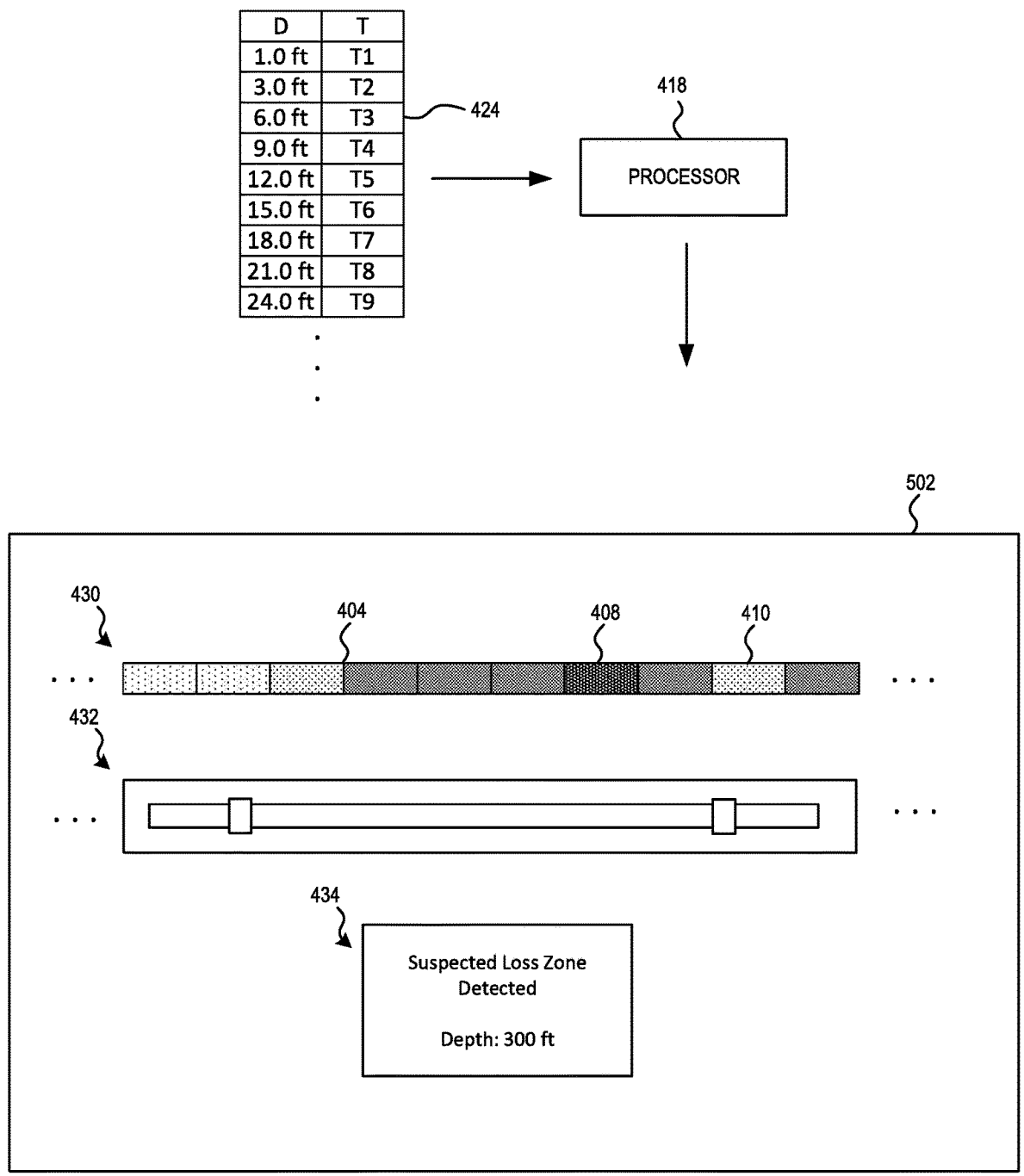
FIG. 7 is a graphical user interface for a system for fiber optic distributed temperature sensing of annular cement curing using cement plug deployment according to an example of the present disclosure.

Referring also to FIG. 7 with continuing reference to FIG. 6, there are shown aspects of a graphical user interface 502 that may be displayed on the display device 428 based on temperature data stored, for example, in the log 424. As noted above, the log 424 may be represented as one or more data structures, such as a table, associating distances along the length of the fiber optic cable 122 (and/or depths within the wellbore 102) with temperatures read by the DTS interrogator 412. The processor 418 may read the temperature data from the log 424 or directly from the DTS interrogator 412 in various embodiments.

The processor 418 may use the temperature data to generate the temperature contrast map 430, which may be graphically (and/or numerically) represented in the graphical user interface 502 by regions designated with a particular color, pattern, symbol, or numeral to represent the temperature at a corresponding point of the wellbore 102. The processor 418 may take into account the geothermal background, which is typically 1-3 degrees per 100 ft., in order to accurately reflect heat attributable to the curing process and not the depth of a particular point within the wellbore 102.

The temperature contrast map 430 may be displayed horizontally or vertically on the display device 428 and may be comparatively displayed, in one embodiment, with a graphical representation of a corresponding portion of a design schematic 432 for the wellbore 102. In some embodiments, the temperature contrast map 430 may be superimposed upon the design schematic 432 or vice versa.

Based on the relative temperatures at different points, the processor 418 can identify the top of cement 404 as, for example, the beginning of a continuous set of regions with heat levels indicative of curing cement 117. The processor 418 may also identify one or more regions 408, 410 containing greater or less than expected amounts of cement 417, potential loss zones 406, etc.

Alternatively, or in addition, the processor 418 may cause one or more notifications 434 to be displayed, alerting the cementer to anomalous temperature readings indicative of loss zones 406 or the like. For example, a notification 434 may be generated when in response to monitoring one or more unexpected temperatures based on one or more of a geothermal profile and a design schematic for the wellbore. The notifications 434 may be displayed in response to detected temperatures being outside pre-determined temperature ranges (or satisfying other requirements), which may be provided or selected by the user.

In some aspects, the tracking of a cementing tool is provided according to one or more of the following statements of the disclosure.

Statement 1. A system comprising: a cementing tool positionable within a casing string of a wellbore; a distributed temperature sensing (DTS) system comprising: a fiber optic cable coupled to the cementing tool; and a DTS interrogator positionable at a surface of the wellbore for transmitting an optical signal through the fiber optic cable and determining from a reflected optical signal a plurality of temperatures along the fiber optic cable; a fiber reel for dispensing the fiber optic cable from a first end of the fiber optic cable in response to a tension in the fiber optic cable as the cementing tool travels down the casing string behind a cement composition; and a processor in communication with the DTS system and configured to monitor the plurality of temperatures along the fiber optic cable while the cement composition cures.

Statement 2. The system of statement 1, wherein the cementing tool is a cementing top plug or a cementing top plug dart.

Statement 3. The system of statements 1-2, wherein the processor is configured to identify a top of cement within the wellbore based on the plurality of temperatures.

Statement 4. The system of statements 1-3, wherein the processor is configured to identify a loss zone within the wellbore based on the plurality of temperatures.

Statement 5. The system of statements 1-4, wherein the processor is configured to identify a first region of the wellbore that has more or less cement than a second region of the wellbore.

Statement 6. The system of statements 1-5, wherein the processor is configured to generate a notification in response to monitoring one or more unexpected temperatures based on one or more of a geothermal profile and a design schematic for the wellbore.

Statement 7. The system of statements 1-6, wherein the processor is configured to generate a visualization based on the plurality of temperatures for display on a display device.

Statement 8. The system of statements 1-7, wherein the visualization comprises at least a portion of a temperature contrast map.

Statement 9. The system of statements 1-8, wherein the at least a portion of the temperature contrast map is comparatively displayed with at least a portion of a design schematic for the wellbore.

Statement 10. The system of statements 1-9, wherein the at least a portion of the temperature contrast map is graphically superimposed upon the at least a portion of the design schematic or vice versa.

Statement 11. The system of statements 1-10, wherein an artificial neural network (ANN) trained with temperature readings from wellbores including at least one known characteristic determines a correlation between at least one temperature at the at least one known characteristic.

Statement 12. The system of statements 1-11, further comprising an additional fiber reel for dispensing the fiber optic cable from a second end of the fiber optic cable.

Statement 13. The system of statements 1-12, wherein the fiber optic cable is an unarmored fiber optic cable.

Statement 14. The system of statements 1-13, wherein the fiber reel includes a drag device for preventing the dispensing of the fiber optic cable in response to the tension in the fiber optic cable being less than a pre-set value.

Statement 15. A method comprising: coupling a fiber optic cable to a cement tool positionable within a casing string of a wellbore, wherein the fiber optic cable is a part of a distributed temperature sensing (DTS) system further including a DTS interrogator positionable at a surface of the wellbore for transmitting an optical signal through the fiber optic cable and determining from a reflected optical signal a plurality of temperatures along the fiber optic cable; coupling one end of the fiber optic cable to a fiber reel for dispensing the fiber optic cable as the cementing tool travels down the casing behind a cement composition; dispensing, by the fiber reel, the fiber optic cable from an end of the fiber optic cable in response to a tension in the fiber optic cable, monitoring the plurality of temperatures via the DTS system while the cement composition cures.

Statement 16. The method of statement 15, wherein the cementing tool is a cementing top plug or a cementing top plug dart.

Statement 17. The method of statements 15-16, further comprising: using the plurality of temperatures to identify one or more of a top of cement within the wellbore, loss zone within the wellbore, or a first region of the wellbore that has more or less cement than a second region of the wellbore.

Statement 18. The method of statements 15-17, generating a notification in response to monitoring one or more unexpected temperatures based on one or more of a geothermal profile and a design schematic for the wellbore.

Statement 19. The method of statements 15-18, generating a visualization based on the plurality of temperatures for display on a display device, wherein the visualization comprises at least a portion of a temperature contrast map.

Statement 20. The method of statements 15-19, further comprising: comparatively displaying at least a portion of the temperature contrast map with at least a portion of a design schematic for the wellbore.

What is claimed is:

1. A system for monitoring cement temperatures, the system comprising:
   a cementing tool positionable within a casing string of a wellbore;
   a distributed temperature sensing (DTS) system comprising:
      a fiber optic cable coupled to the cementing tool; and
      a DTS interrogator positionable at a surface of the wellbore for transmitting an optical signal through the fiber optic cable and determining from a reflected optical signal a plurality of temperatures along the fiber optic cable;
   a fiber reel for dispensing the fiber optic cable in response to a tension in the fiber optic cable as the cementing tool travels down the casing string behind a cement composition during a cementing operation that provides the cement composition to the wellbore; and
   a processor in communication with the DTS system and configured to monitor the plurality of temperatures along the fiber optic cable while the cement composition cures after the fiber reel dispenses the fiber optic cable during the cementing operation.

2. The system of claim 1, wherein the cementing tool is a cementing top plug or a cementing top plug dart and the reflected optical signal includes reflections along the fiber optic cable that are associated with respective locations along the fiber optic cable.

3. The system of claim 1, wherein the processor is configured to identify a top of cement within the wellbore based on the plurality of temperatures.

4. The system of claim 1, wherein the processor is configured to identify a loss zone within the wellbore based on the plurality of temperatures.

5. The system of claim 1, wherein the processor is configured to identify a first region of the wellbore that has more or less cement than a second region of the wellbore.

6. The system of claim 1, wherein the processor is configured to generate a notification in response to monitoring one or more unexpected temperatures based on one or more of a geothermal profile and a design schematic for the wellbore.

7. The system of claim 1, wherein the processor is configured to generate a visualization based on the plurality of temperatures for display on a display device.

8. The system of claim 7, wherein the visualization comprises at least a portion of a temperature contrast map.

9. The system of claim 8, wherein the at least a portion of the temperature contrast map is comparatively displayed with at least a portion of a design schematic for the wellbore.

10. The system of claim 9, wherein the at least a portion of the temperature contrast map is graphically superimposed upon the at least a portion of the design schematic or vice versa.

11. The system of claim 1, wherein an artificial neural network (ANN) trained with temperature readings from wellbores including at least one known characteristic identifies a correlation between at least one temperature at the at least one known characteristic.

12. The system of claim 1, further comprising an additional fiber reel for dispensing the fiber optic cable from an end of the fiber optic cable.

13. The system of claim 1, wherein the fiber optic cable is an unarmored fiber optic cable.

14. The system of claim 1, wherein the fiber reel includes a drag device for preventing the dispensing the fiber optic cable in response to the tension in the fiber optic cable being less than a preset value.

15. A method for monitoring cement temperatures, the method comprising:
   coupling a fiber optic cable to a cementing tool positionable within a casing string of a wellbore, wherein the fiber optic cable is a part of a distributed temperature sensing (DTS) system further including a DTS interrogator positionable at a surface of the wellbore for transmitting an optical signal through the fiber optic cable and determining from a reflected optical signal a plurality of temperatures along the fiber optic cable;
   coupling one end of the fiber optic cable to a fiber reel for dispensing the fiber optic cable;
   dispensing, by the fiber reel, the fiber optic cable in response to a tension in the fiber optic cable as the cementing tool travels down the casing string behind a cement composition during a cementing operation that provides the cement composition to the wellbore; and
   monitoring the plurality of temperatures via the DTS system while the cement composition cures after the fiber reel dispenses the fiber optic cable during the cementing operation.

16. The method of claim 15, wherein the cementing tool is a cementing top plug or a cementing top plug dart.

17. The method of claim 15, further comprising:
   performing an analysis to identify a temperature of the plurality of temperatures to identify one or more of a top of cement within the wellbore, a loss zone within the wellbore, or a first region of the wellbore that has more or less cement than a second region of the wellbore.

18. The method of claim 15, further comprising:
   generating a notification in response to monitoring one or more unexpected temperatures based on one or more of a geothermal profile and a design schematic for the wellbore.

19. The method of claim 15, further comprising:
   generating a visualization based on the plurality of temperatures for display on a display device, wherein the visualization comprises at least a portion of a temperature contrast map.

20. The method of claim 19, further comprising:
   comparatively displaying at least a portion of the temperature contrast map with at least a portion of a design schematic for the wellbore.

21. A method for monitoring cement temperatures, the method comprising:
   coupling a fiber optic cable to a cementing tool positionable within a casing string of a wellbore, wherein the fiber optic cable is a part of a distributed temperature sensing (DTS) system further including a DTS interrogator positionable at a surface of the wellbore for transmitting an optical signal through the fiber optic cable and determining from a reflected optical signal a plurality of temperatures along the fiber optic cable and respective locations along the fiber optic cable for each of the plurality of temperatures;
   coupling one end of the fiber optic cable to a fiber reel for dispensing the fiber optic cable;
   dispensing, by the fiber reel, the fiber optic cable in response to a tension in the fiber optic cable; and monitoring the plurality of temperatures and the respective locations for each of the plurality of temperatures via the DTS system while a cement composition cures.

* * * * *